US010115361B2

(12) United States Patent
Zhang et al.

(10) Patent No.: US 10,115,361 B2
(45) Date of Patent: Oct. 30, 2018

(54) DISPLAY DEVICE

(71) Applicant: BOE TECHNOLOGY GROUP CO., LTD., Beijing (CN)

(72) Inventors: Yongxin Zhang, Beijing (CN); Qingyong Li, Beijing (CN); Jianfu Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 58 days.

(21) Appl. No.: 15/292,386

(22) Filed: Oct. 13, 2016

(65) Prior Publication Data

US 2017/0116943 A1 Apr. 27, 2017

(30) Foreign Application Priority Data

Oct. 23, 2015 (CN) .......................... 2015 1 0698295

(51) Int. Cl.
*G06F 3/038* (2013.01)
*G09G 3/36* (2006.01)
*G09G 3/00* (2006.01)

(52) U.S. Cl.
CPC ........... *G09G 3/3659* (2013.01); *G09G 3/006* (2013.01); *G09G 3/3677* (2013.01);
(Continued)

(58) Field of Classification Search
CPC .... G09G 3/3659; G09G 3/006; G09G 3/3677; G09G 2330/12; G09G 2310/08; G09G 2300/0828
See application file for complete search history.

(56) References Cited

U.S. PATENT DOCUMENTS

2006/0279313 A1 12/2006 Fujita et al.
2010/0156755 A1* 6/2010 Chou .................... G06F 3/1423
345/1.1

(Continued)

FOREIGN PATENT DOCUMENTS

CN 100449361 C 1/2009
CN 101667379 A 3/2010

(Continued)

OTHER PUBLICATIONS

First Chinese Office Action dated Mar. 28, 2017: Appln. No. 201510698295.9.

(Continued)

*Primary Examiner* — Nelson Rosario
*Assistant Examiner* — Andrew Lee
(74) *Attorney, Agent, or Firm* — Ladas & Parry LLP; Loren K. Thompson

(57) ABSTRACT

A display device is presented which includes a timing control module, a source driving module and a gate driving module. The timing control module being configured to output a driving signal to the source driving module and the gate driving module respectively. The display device further includes a detection module and a reminding module. The detection module is configured to acquire the driving signal and detect the driving signal and configured to output a warning control signal to the reminding module when detecting an abnormity of the driving signal. The reminding module is configured to acquire the warning control signal output by the detection module and configured to output a warning under control of the warning control signal.

11 Claims, 2 Drawing Sheets

(52) U.S. Cl.
CPC . *G09G 2300/0828* (2013.01); *G09G 2310/08* (2013.01); *G09G 2330/12* (2013.01)

(56) References Cited

U.S. PATENT DOCUMENTS

| | | | | |
|---|---|---|---|---|
| 2014/0118316 | A1* | 5/2014 | Ijima | G09G 3/3611 345/204 |
| 2014/0266244 | A1 | 9/2014 | Minaev et al. | |
| 2014/0312908 | A1* | 10/2014 | Lemons | G09G 3/006 324/414 |

FOREIGN PATENT DOCUMENTS

| | | | |
|---|---|---|---|
| CN | 103794180 | A | 5/2014 |
| CN | 104050907 | A | 9/2014 |
| CN | 204087751 | U | 1/2015 |
| CN | 104980245 | A | 10/2015 |
| JP | 2009058685 | A | 3/2009 |
| JP | 2009-251059 | A | 10/2009 |

OTHER PUBLICATIONS

The Second Chinese Office Action dated Dec. 4, 2017: Appln. No. 201510698295.9.

* cited by examiner

DISPLAY DEVICE

TECHNICAL FIELD

Embodiments of the present disclosure relate to a display device.

BACKGROUND

Liquid crystal displays (LCD) have been widely used in various display apparatuses. In some particular applications, such as vehicle-mounted instruments, information displayed on the liquid crystal screen is very important and display on the liquid crystal screen needs to be paid attention to all the time. However, at present, LCD is only used as a video output terminal. When abnormal display occurs, one can only intuitively see the abnormity in display, but cannot determine whether the driving signal of LCD is normal or not and can hardly find the problem.

SUMMARY

At least one embodiment of the present disclosure provides a display device, comprising a timing control module, a source driving module and a gate driving module, the timing control module being configured to output a driving signal to the source driving module and the gate driving module respectively, the display device further comprising a detection module and a reminding module, wherein the detection module is configured to acquire the driving signal and detect the driving signal, and output a warning control signal to the reminding module when detecting an abnormity of the driving signal; and the reminding module is configured to acquire the warning control signal output by the detection module and output a warning under control of the warning control signal.

By use of the detection module, the display device according to embodiments of the present disclosure acquires the driving signal output by the timing control module to the source driving module and/or the gate driving module and detects the driving signal, and outputs a warning control signal to the reminding module when detecting that the driving signal is abnormal. The reminding module is configured to acquire the warning control signal output by the detection module and make the display device output a warning under control of the warning control signal. Thus, when there is an abnormity in the driving signal output by the timing control module to the source driving module and/or the gate driving module, the display device can output a warning so as to facilitate locating the problem.

BRIEF DESCRIPTION OF THE DRAWINGS

In order to clearly illustrate the technical solutions of the embodiments of the disclosure, the drawings of the embodiments will be briefly described in the following; it is obvious that the drawings described below are only related to some embodiments of the disclosure and thus are not limitative of the disclosure.

REFERENCE SIGNS

1—timing control module;
11—timing control unit;
12—voltage conversion unit;
2—source driving module;
3—gate driving module;
4—detection module;
41—acquiring unit;
42—analog-digital conversion unit;
43—data processing unit;
44—output unit;
45—signal amplifying unit;
5—reminding module.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Figure 1:
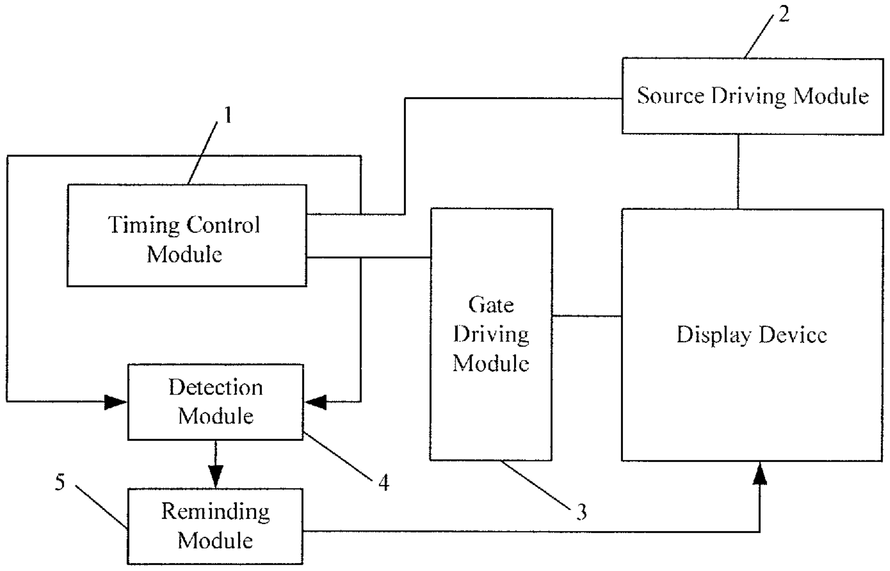
FIG. 1 is an illustrative view of a driving structure of a display device according to one embodiment of the present disclosure.

At least one embodiment of the present disclosure provides a display device. As illustrated in FIG. 1, the display device comprises a timing control module 1, a source driving module 2 and a gate driving module 3. The timing control module 1 is configured to output a driving signal to the source driving module 2 and/or the gate driving module 3. The display device further comprises a detection module 4 and a reminding module 5, wherein the detection module 4 is configured to acquire the driving signal and detect the driving signal, and output a warning control signal to the reminding module 5 where detecting that the driving signal is abnormal; and the reminding module 5 is configured to acquire the warning control signal and make the display device output a warning under control of the warning control signal.

In the above-described display device, circuit configurations and positions of the detection module and the reminding module are not restricted in the present disclosure. The detection module and the reminding module can be circuit cells integrated in a chip such as microcontroller unit (MCU) or FPGA (Field Programmable Gate Array) or can be separate circuit configurations, which are not restricted herein.

In the above-described display device, the detection module being configured to acquire the driving signal output by the timing control module to the source driving module and/or the gate driving module means that the detection module can be configured to acquire the driving signal output by the timing control module to the source driving module and the gate driving module, or alternatively, the detection module can be configured to acquire the driving signal output by the timing control module to the source driving module, or alternatively, the detection module can be configured to acquire driving signal output by the timing control module to the gate driving module.

In the above-described display device, the timing control module is configured to convert a digital video signal transmitted by a front-end video signal processing circuit into an image data signal required by the source driving module. For example, it can convert LVDS (Low-Voltage Differential Signaling) signal into Mini-LVDS (Mini Low-Voltage Differential Signaling) signal or RSDS (Reduced Swing Differential Signaling) signal. In addition, the timing control module is also configured to generate a driving signal for controlling the source driving module and/or the gate driving module. The configuration of the timing control module is not restricted in the present disclosure.

In the above-described display device, the source driving module is configured to generate a source driving signal and the gate driving module is configured to generate a gate driving signal, thereby achieving display. The configurations of the source driving module and the gate driving module are not restricted in the present disclosure.

The type of the display device is not restricted in the present disclosure. The display device can be a liquid crystal display device or an OLED (Organic Light-Emitting Diode) display device.

In the display device according to at least one embodiment of the present disclosure, the detection module is configured to acquire the driving signal output by the timing control module to the source driving module and/or the gate driving module and detect the driving signal, and outputs a warning control signal to the reminding module when detecting that the driving signal is abnormal. The reminding module is configured to acquire the warning control signal output by the detection module and make the display device output a warning under control of the warning control signal. Thus, when there is an abnormity in the driving signal output by the timing control module to the source driving module and/or the gate driving module, the display device can output a warning so as to facilitate locating the problem.

Figure 2:
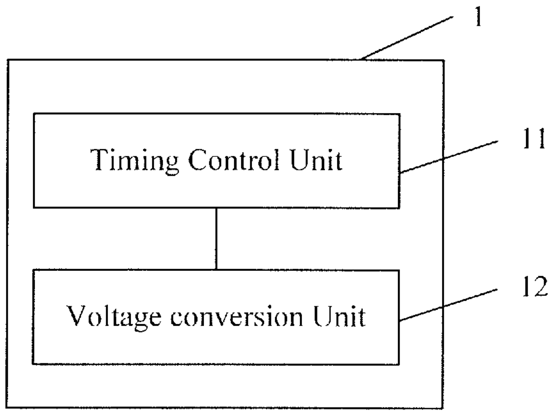
FIG. 2 is an illustrative structural view of the timing control module as illustrated in FIG. 1.

In one embodiment of the present disclosure, as illustrated in FIG. 2, the timing control module 1 comprises a timing control unit 11 and a voltage conversion unit 12. The timing control unit 11 is configured to output an image data signal and a data control signal to the source driving module, and/or output a column control signal to the gate driving module. The voltage conversion unit 12 is configured to provide different voltages to the gate driving module and/or the source driving module.

Herein, it is to be noted that the above-described timing control unit can be a timing controller and the voltage conversion unit can be a DC/DC Converter (a direct-current to direct current converter) or can of course have other circuit configurations which are not restricted herein. Further, only structures and configurations in the display device which are associated with the inventive points are described in detail in the present disclosure. Other configurations, such as a gamma correction voltage unit, which are also included in the timing control module, will not be elaborated herein.

Voltages supplied by the voltage conversion unit are not restricted in the embodiments of the present disclosure. For example, the voltage conversion unit can supply the gate driving module with VGH voltage (high voltage of gate driving pulse), VGL voltage (low voltage of gate driving pulse) and the like, wherein the VGH voltage and VGL voltage can ensure that the thin film transistor of the display device is sufficiently turned on when being triggered and is completely turned off when not being triggered anymore. The voltage conversion unit can also supply operating voltages to the source driving module and other modules.

The driving signal supplied by the timing control unit is not restricted in the present disclosure. The timing control unit is configured to output an image data signal and a data control signal to the source driving module. For example, the data control signal can be POL signal (i.e., progressive polarity inversion control signal for source data signal), TP signal (i.e., enable control signal for source driving output data signal) and etc. The image data signal can be RSDS signal or Mini-LVDS signal. The timing control unit is configured to output a column control signal to the source driving module. For example, the column control signal can be STV signal (i.e., starting control signal of gate driving output), OE signal (enable control signal of opening/closing scanning lines), CPV signal (i.e., clock signal of controlling sequential opening of scanning lines) and etc.

Figure 3:
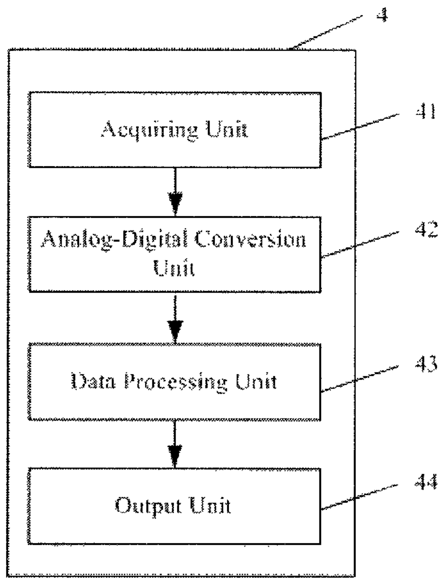
FIG. 3 is an illustrative structural view of the detection module as illustrated in FIG. 1.

In one embodiment of the present disclosure, as illustrated in FIG. 3, the detection module 4 comprises an acquiring unit 41, an analog-digital conversion unit 42, a data processing unit 43, and an output unit 44.

The acquiring unit 41 is configured to acquire the driving signal output by the timing control module to the source driving module and/or the gate driving module. For example, the acquiring unit can be an interface through which the driving signal is input into the detection module.

The analog-digital conversion unit 42 is configured to perform an analog-digital conversion for the driving signal output by the acquiring unit. The processing chip such as MCU is applicable to digital signal processing, while the driving signal output by the acquiring unit is usually an analog signal. Therefore, it is necessary to provide an analog-digital conversion unit to facilitate subsequent processing. For example, the analog-digital conversion unit can be an analog-digital converter.

The data processing unit 43 is configured to determine whether the driving signal after being subjected to analog-digital conversion is the same as a pre-stored corresponding signal. It is to be noted that the data processing unit can determine whether the driving signal after being subjected to analog-digital conversion is the same as a pre-stored corresponding signal based on a plurality of parameters. For example, the data processing unit can compare voltage waveforms, current waveforms and other parameters of converted driving signal and pre-stored driving signal, which are not restricted herein. For example, the data processing unit can be a chip having a data processing function.

The output unit 44 is configured to output a warning control signal to the reminding module when detecting an abnormity of the driving signal. The type of the warning control signal is not restricted herein. For example, the warning control signal can be a high voltage signal or the like.

Figure 4:
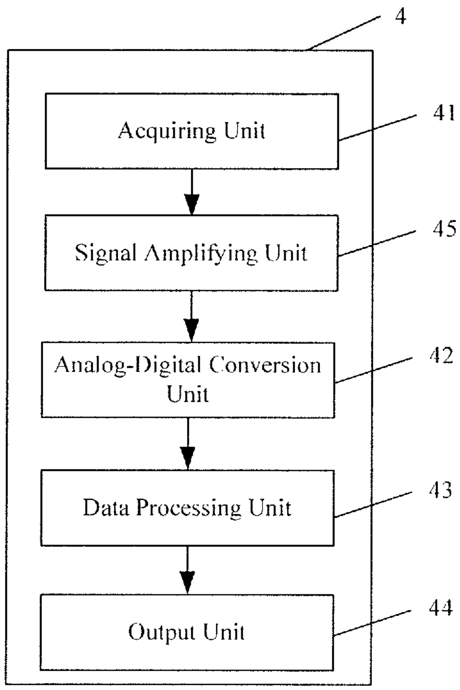
FIG. 4 is another illustrative structural view of the detection module as illustrated in FIG. 1.

In one embodiment of the present disclosure, as illustrated in FIG. 4, the detection module 4 further comprises:

a signal amplifying unit 45, configured to amplify the driving signal output by the acquiring unit and output amplified driving signal to the analog-digital conversion unit. Since the driving signal has a relatively low voltage which does not facilitate subsequent judgment, the signal amplifying unit is provided. For example, the signal amplifying unit can be an amplifier which is configured to amplify the driving signal output by the acquiring unit.

Hereinafter, a description is made to two arrangements of the detection module and the reminding module according to the embodiments of the present disclosure.

As a first arrangement, the timing control module, the detection module and the reminding module are all disposed on a timing control circuit board of the display device. The timing control circuit board is a TCON board on which a timing control module is typically provided. Since the detection module needs to acquire the driving signal output by the timing control module to the source driving module and/or the gate driving module, providing the detection module and the reminding module on the timing control circuit board facilitates design and manufacture of circuit while enabling cost reduction.

As a second arrangement, the detection module and the reminding module are both disposed on a signal processing circuit board of the display device, while the timing control module is disposed on the timing control circuit board of the display device. The signal processing circuit board is the motherboard of the display device and is configured to receive video signals and perform a corresponding processing.

It is to be noted that the arrangements of the detection module and the reminding module are not restricted in the present disclosure and the above two arrangements are only described by way of example. Optionally, the above-described reminding module can comprise a light-emitting diode which emits light under control of the warning control signal so as to notice the user.

In one embodiment of the present disclosure, the above-described reminding module can comprise a buzzer which is configured to beep under control of the warning control signal so as to notice the user.

For example, the reminding module can be also configured to acquire the warning control signal output by the detection module and send warning data to the display control module of the display device under control of the warning control signal, so that the display device performs display according to the warning data. Thus, it is very intuitive to have the information displayed directly whether the driving signal is normal or not.

In one embodiment of the present disclosure, the detection module is also configured to send an OFF signal to the timing control module when detecting an abnormity of the driving signal, while sending an ON signal to a backup timing control module. The display device further comprises a backup timing control module which is configured to output a driving signal to the source driving module and/or the gate driving module in response to an ON signal. As such, the display device can replace the malfunctioned timing control module with a backup timing control module so as to output a normal driving signal and achieve a normal display.

The foregoing are merely exemplary embodiments of the disclosure, but are not used to limit the protection scope of the disclosure. The protection scope of the disclosure shall be defined by the attached claims.

The present disclosure claims priority of Chinese Patent Application No. 201510698295.9 filed on Oct. 23, 2015, the disclosure of which is hereby entirely incorporated by reference as a part of the present disclosure.

The invention claimed is:

1. A display device, comprising a timing control module, a source driving module and a gate driving module, the timing control module being configured to output a driving signal to the source driving module and the gate driving module respectively, the display device further comprising a detection module and a reminding module, wherein the detection module is configured to acquire the driving signal and detect the driving signal, and output a warning control signal to the reminding module when detecting an abnormity of the driving signal; and the reminding module is configured to acquire the warning control signal output by the detection module and output a warning under control of the warning control signal; and wherein the detection module comprises:

an acquiring unit, which is configured to acquire the driving signal output by the timing control module to the source driving module and/or the gate driving module;

an analog-digital conversion unit, which is configured to perform an analog-digital conversion on the driving signal output by the acquiring unit;

a data processing unit, which is configured to determine whether the driving signal after being subjected to analog-digital conversion is the same as a pre-stored corresponding signal; and an output unit, which is configured to output a warning control signal to the reminding module when detecting the abnormity of the driving signal.

2. The display device according to claim 1, wherein the timing control module comprises a timing control unit and a voltage conversion unit;

the voltage conversion unit is configured to provide voltages having different values to the gate driving module and/or the source driving module; and the timing control unit is configured to output an image data signal and a data control signal to the source driving module, and/or output a column control signal to the source driving module.

3. The display device according to claim 1, wherein the detection module further comprises:

a signal amplifying unit, which is configured to amplify the driving signal output by the acquiring unit and output it to the analog-digital conversion unit.

4. The display device according to claim 2, wherein the detection module comprises:

an acquiring unit, which is configured to acquire the driving signal output by the timing control module to the source driving module and/or the gate driving module;

an analog-digital conversion unit, which is configured to perform an analog-digital conversion on the driving signal output by the acquiring unit;

a data processing unit, which is configured to determine whether the driving signal after being subjected to analog-digital conversion is the same as a pre-stored corresponding signal; and an output unit, which is configured to output a warning control signal to the reminding module when detecting the abnormity of the driving signal.

5. The display device according to claim 4, wherein the detection module further comprises:

a signal amplifying unit, which is configured to amplify the driving signal output by the acquiring unit and output it to the analog-digital conversion unit.

6. The display device according to claim 1, wherein the timing control module, the detection module and the reminding module are all disposed on a timing control circuit board of the display device.

7. The display device according to claim 1, wherein the detection module and the reminding module are both disposed on a signal processing circuit board of the display device, while the timing control module is disposed on the timing control circuit board of the display device.

8. The display device according to claim 1, wherein the reminding module comprises a light-emitting diode which emits light under control of the warning control signal.

9. The display device according to claim 1, wherein the reminding module comprises a buzzer which is configured to beep under control of the warning control signal.

10. The display device according to claim 1, wherein the reminding module is configured to acquire the warning control signal output by the detection module and send warning data to a display control module of the display device under control of the warning control signal, so that the display device performs display according to the warning data.

11. The display device according to claim 1, further comprising a backup timing control module which is configured to output a driving signal to the source driving module and/or the gate driving module according to an ON signal, wherein the detection module is further configured to send an OFF signal to the timing control module when detecting the abnormity of the driving signal, while send an ON signal to a backup timing control module.

* * * * *